US011325559B2

(12) United States Patent
Min et al.

(10) Patent No.: US 11,325,559 B2
(45) Date of Patent: May 10, 2022

(54) ROOF AIRBAG APPARATUS

(71) Applicant: HYUNDAI MOBIS CO., LTD., Seoul (KR)

(72) Inventors: Byung Ho Min, Yongin-si (KR); Dong Oh Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/090,705

(22) Filed: Nov. 5, 2020

(65) Prior Publication Data

US 2021/0138996 A1 May 13, 2021

(30) Foreign Application Priority Data

Nov. 7, 2019 (KR) .................. 10-2019-0141559

(51) Int. Cl.
*B60R 21/02* (2006.01)
*B60R 21/26* (2011.01)
*B60R 21/214* (2011.01)

(52) U.S. Cl.
CPC ............ *B60R 21/26* (2013.01); *B60R 21/214* (2013.01); *B60R 2021/028* (2013.01); *B60R 2021/0253* (2013.01)

(58) Field of Classification Search
CPC .......... B60R 21/233; B60R 2021/2612; B60R 2021/23192; B60R 21/2646; B60R 2021/0253; B60R 2021/028; B60R 21/214; B60R 21/26
See application file for complete search history.

(56) References Cited

U.S. PATENT DOCUMENTS

| | | | | |
|---|---|---|---|---|
| 2015/0210242 A1* | 7/2015 | Kashio | .................... | B60R 21/26 280/730.2 |
| 2019/0016292 A1* | 1/2019 | Son | ........................ | B60R 21/233 |
| 2020/0384940 A1* | 12/2020 | Sekizuka | .............. | B60R 21/237 |

FOREIGN PATENT DOCUMENTS

| | | | | | |
|---|---|---|---|---|---|
| CN | 106553605 A | * | 4/2017 | ............ | B60R 21/04 |
| KR | 20090065703 A | * | 6/2009 | | |
| KR | 20090078486 A | * | 7/2009 | | |
| KR | 20170049651 A | * | 5/2017 | | |
| KR | 20210114297 A | * | 9/2021 | | |

\* cited by examiner

*Primary Examiner* — Paul N Dickson
*Assistant Examiner* — Maxwell L Meshaka
(74) *Attorney, Agent, or Firm* — NovoTechIP International PLLC

(57) ABSTRACT

A roof airbag apparatus may include: a first-row deployment part deployed from the front to the rear of a roof so as to cover a front area, when gas is supplied from a gas supply part; a second-row deployment part coupled to a front end of the first-row deployment part so as to communicate with the first-row deployment part, and configured to cover a rear area which is deployed to the rear when the first-row deployment part is deployed; and an auxiliary deployment part coupled to a top or bottom surface of the first-row deployment part so as to communicate with the first-row deployment part, and configured to increase/decrease the top-to-bottom thickness of the first-row deployment part, when deployed.

12 Claims, 6 Drawing Sheets

ROOF AIRBAG APPARATUS

CROSS-REFERENCE TO RELATED APPLICATION

This application claims priority from and the benefit of Korean Patent Application No. 10-2019-0141559, filed on Nov. 7, 2019, which is hereby incorporated by reference for all purposes as if set forth herein.

BACKGROUND

Field

Exemplary embodiments of the present disclosure relate to a roof airbag apparatus, and more particularly, to a roof airbag apparatus capable of preventing a driver or passenger from being injured or thrown out of a vehicle, when a vehicle accident occurs.

Discussion of the Background

In general, a vehicle includes airbag apparatuses installed for the safety of a driver or passenger. At a panorama roof positioned at the ceiling of the vehicle, a roof airbag apparatus is installed. Such a roof airbag apparatus is inflated and deployed in case of a roll over of the vehicle, and prevents a driver or passenger from being injured or thrown out of the vehicle.

In the related art, however, when the vehicle rolls over, an airbag cushion is bent toward the ceiling of the vehicle by an impact applied to the head of the driver or passenger. In this case, the bending deformation in the airbag cushion may be increased to raise the possibility that the driver or passenger will be injured or thrown out of the vehicle.

SUMMARY

Various embodiments are directed to a roof airbag apparatus which can reinforce the thickness of a first-row deployment part by deploying an auxiliary deployment part in case of a vehicle accident, and thus not only reduce deformation caused by an external force but also improve shock absorption performance, thereby stably protecting a passenger.

In an embodiment, a roof airbag apparatus may include: a first-row deployment part deployed from a front to a rear of a roof so as to cover a front area, when gas is supplied from a gas supply part; a second-row deployment part coupled to a front end of the first-row deployment part so as to communicate with the first-row deployment part, and configured to cover a rear area which is deployed to a rear when the first-row deployment part is deployed; and an auxiliary deployment part coupled to a top or bottom surface of the first-row deployment part so as to communicate with the first-row deployment part, and configured to increase/decrease a top-to-bottom thickness of the first-row deployment part, when deployed.

The auxiliary deployment part may be folded to communicate with a left or right end of the first-row deployment part, and coupled to the top or bottom surface of the first-row deployment part.

The auxiliary deployment part may include: a first chamber having a first connection end formed on one side thereof and a first sewed end formed on the opposite side of the one side, wherein the first connection end is coupled to the left end of the first-row deployment part so as to communicate with the first-row deployment part, and the first sewed end is coupled to the top or bottom of the first-row deployment part; and a second chamber having a second connection end formed on one side thereof and a second sewed end formed on the opposite side of the one side, wherein the second connection end is coupled to the right end of the first-row deployment part so as to communicate with the first-row deployment part, and the second sewed end is coupled to the top or bottom of the first-row deployment part.

The first and second sewed ends may be sewed to abut on each other at the top or bottom of the first-row deployment part.

The first and second sewed ends may be sewed to abut on each other at the center position of the first-row deployment part in a side-to-side direction, while having a length in a front-to-rear direction.

The first-row deployment part may have a first filling space formed therein, the first filling space being filled with gas supplied from the gas supply part, the second-row deployment part may have a second filling space formed therein, the second filling space communicating with the first filling space in a front-to-rear direction, and each of the first and second chambers may have an auxiliary filling space formed therein, the auxiliary filling space communicating with the first filling space in a lateral direction.

The auxiliary filling space of the first chamber may communicate with the first filling space through one or more first paths in the lateral direction, and the auxiliary filling space of the second chamber may communicate with the first filling space through one or more second paths in the lateral direction.

The plurality of first paths may be formed in the front-to-rear direction so as to be spaced apart from each other, and the plurality of second paths may be formed in the front-to-rear direction so as to be spaced apart from each other.

The auxiliary filling space may be horizontally divided into a plurality of spaces by one or more seam parts, such that the plurality of spaces communicate with one another.

The seam parts may have a length in a side-to-side direction, are disposed in the front-to-rear direction of the auxiliary space so as to be spaced apart from each other, and divide the auxiliary filling space in the front-to-rear direction.

A connection flow path may be formed on a left and right of the seam part so as to extend in the front-to-rear direction, and the connection flow path may connect the auxiliary filling spaces, divided by the seam parts, to each other.

The roof may have a pair of tether guides formed on a left and right sides thereof, and having a length in the front-to-rear direction, and both ends of the first-row deployment part and both ends of the second-row deployment part in the side-to-side direction may be coupled to the respective tether guides so as to slide in the front-to-rear direction along the tether guides.

In accordance with the embodiment of the present disclosure, the roof airbag apparatus can reinforce the thickness of the first-row deployment part by deploying the auxiliary deployment part in case of a vehicle accident, and thus not only reduce deformation caused by an external force but also improve shock absorption performance, thereby stably protecting a passenger.

DETAILED DESCRIPTION OF THE ILLUSTRATED EMBODIMENTS

Hereinafter, a roof airbag apparatus will be described below with reference to the accompanying drawings through various exemplary embodiments.

The advantages and characteristics of the present disclosure and a method for achieving the advantages and characteristics will be clearly described through the following embodiments with reference to the accompanying drawings.

However, the present disclosure may be embodied in different forms and should not be construed as limited to the embodiments set forth herein. Rather, these embodiments are provided so that this disclosure will be thorough and complete, and will fully convey the scope of the present invention to those skilled in the art. The present disclosure is only defined by the scope of claims.

Moreover, detailed descriptions related to well-known functions or configurations will be ruled out in order not to unnecessarily obscure subject matters of the present disclosure.

Figure 1:
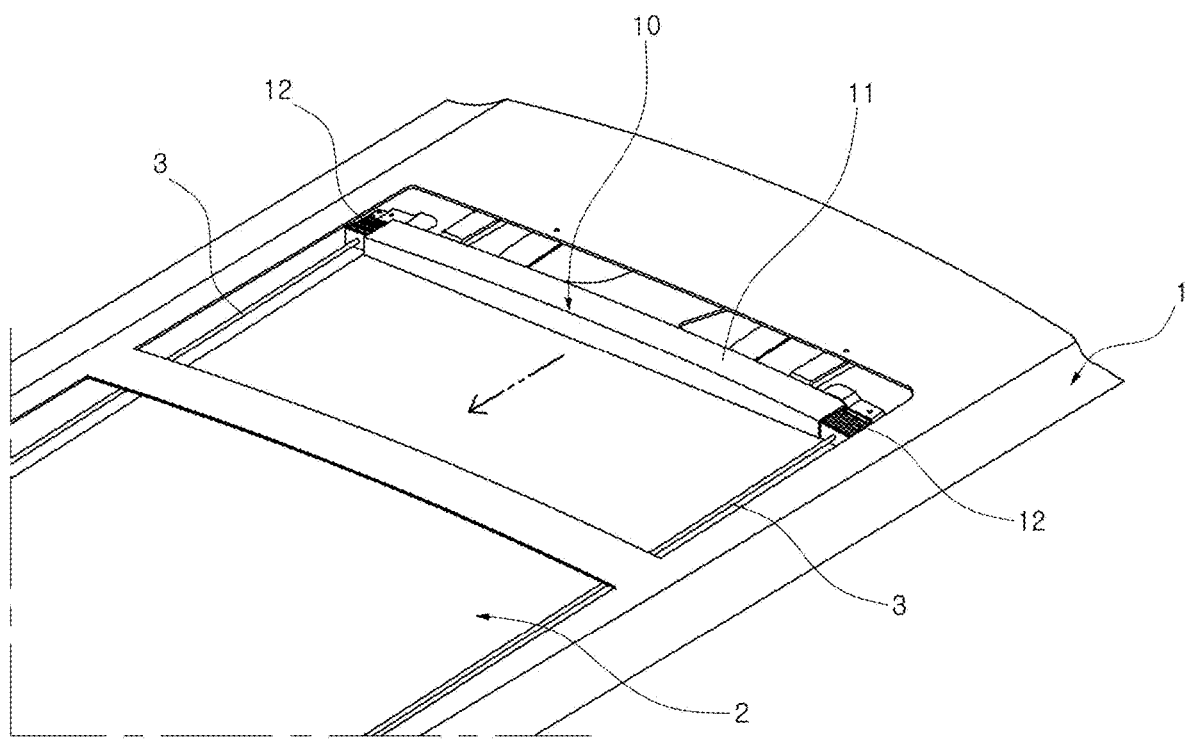
FIG. 1 is a perspective view illustrating that a roof airbag apparatus in accordance with an embodiment of the present disclosure is installed at the roof of a vehicle.
Figure 2:
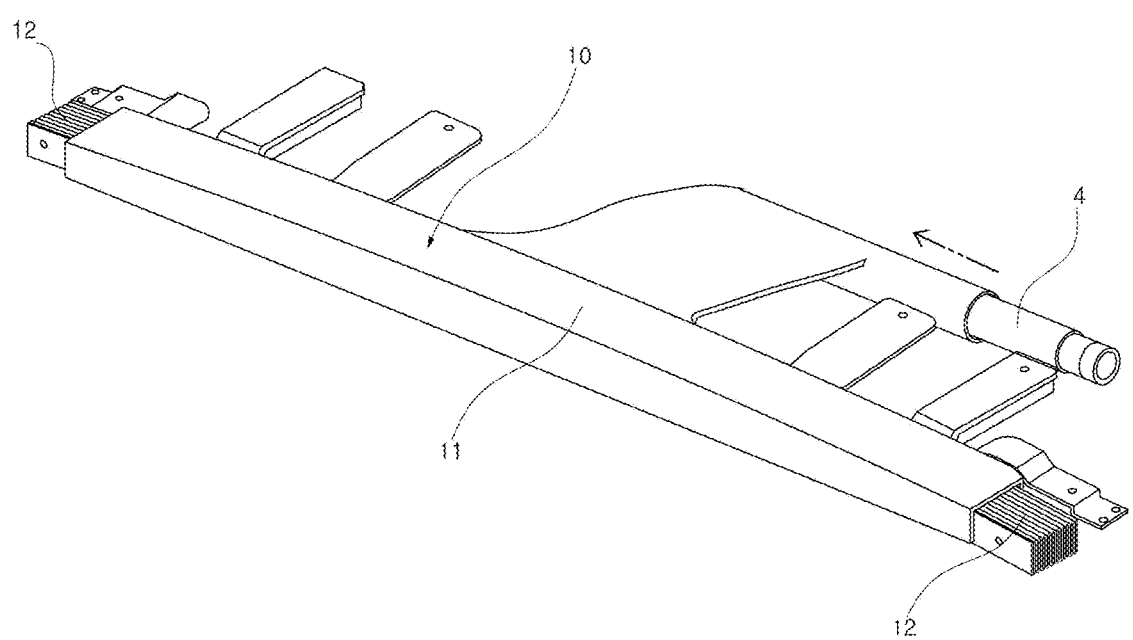
FIG. 2 is a perspective view illustrating the roof airbag apparatus in accordance with the embodiment of the present disclosure.
Figure 3:
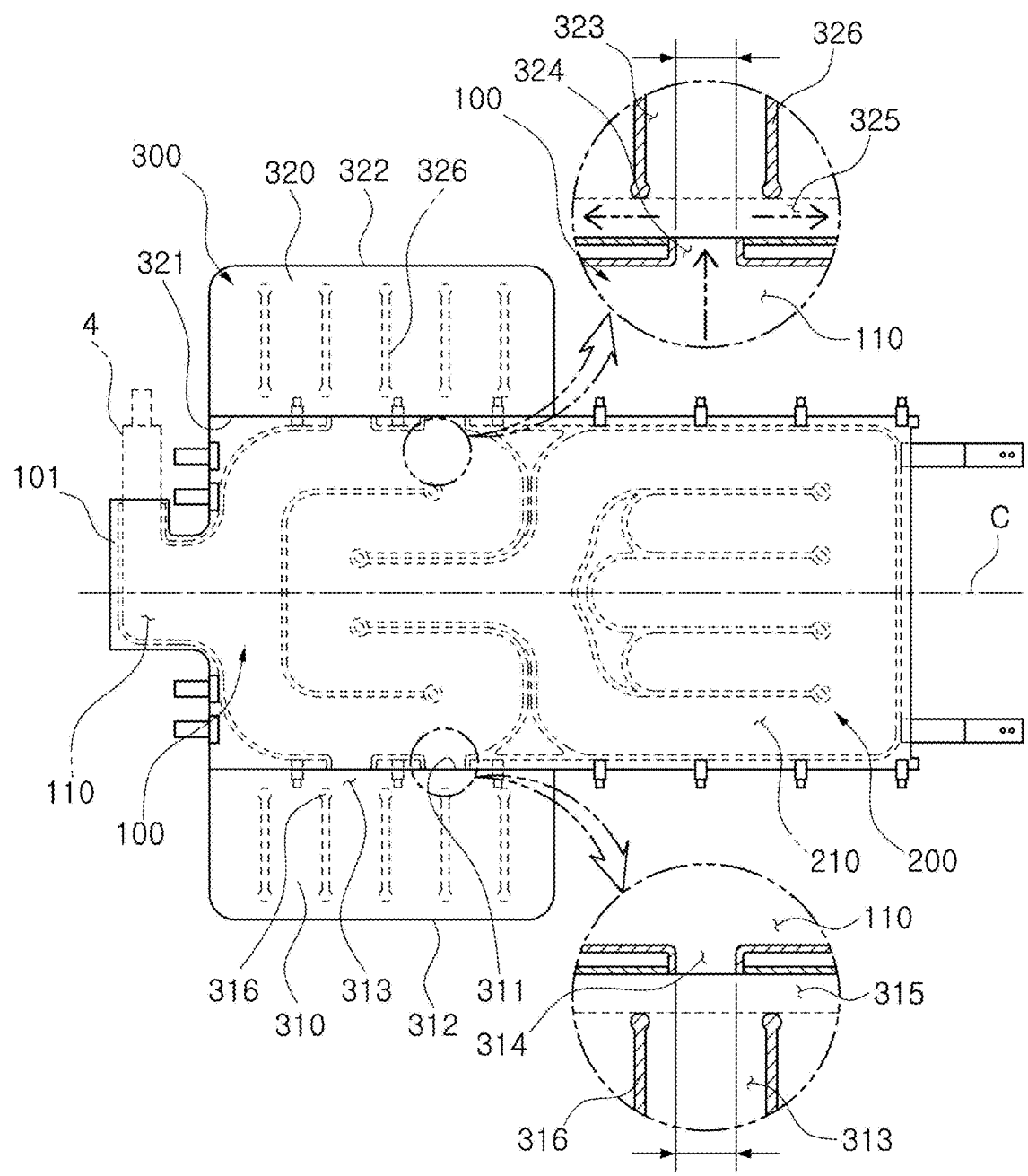
FIG. 3 is a diagram illustrating that a first-row deployment part, a second-row deployment part and an auxiliary deployment part of the roof airbag apparatus in accordance with the embodiment of the present disclosure are unfolded.

FIG. 1 is a perspective view illustrating that a roof airbag apparatus in accordance with an embodiment of the present disclosure is installed at the roof of a vehicle, FIG. 2 is a perspective view illustrating the roof airbag apparatus in accordance with the embodiment of the present disclosure, and FIG. 3 is a diagram illustrating that a first-row deployment part, a second-row deployment part and an auxiliary deployment part of the roof airbag apparatus in accordance with the embodiment of the present disclosure are unfolded.

Figure 4:
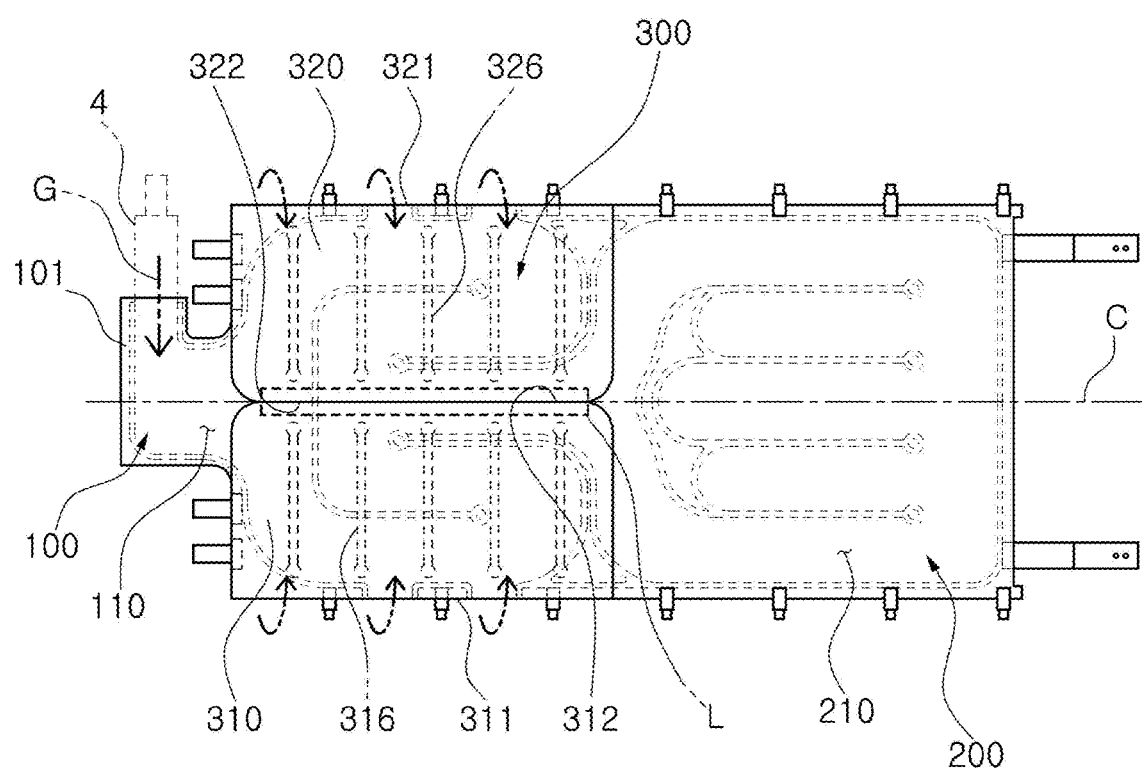
FIG. 4 is a diagram illustrating that the auxiliary deployment part of the roof airbag apparatus in accordance with the embodiment of the present disclosure is sewed to the first-row deployment part.
Figure 5:
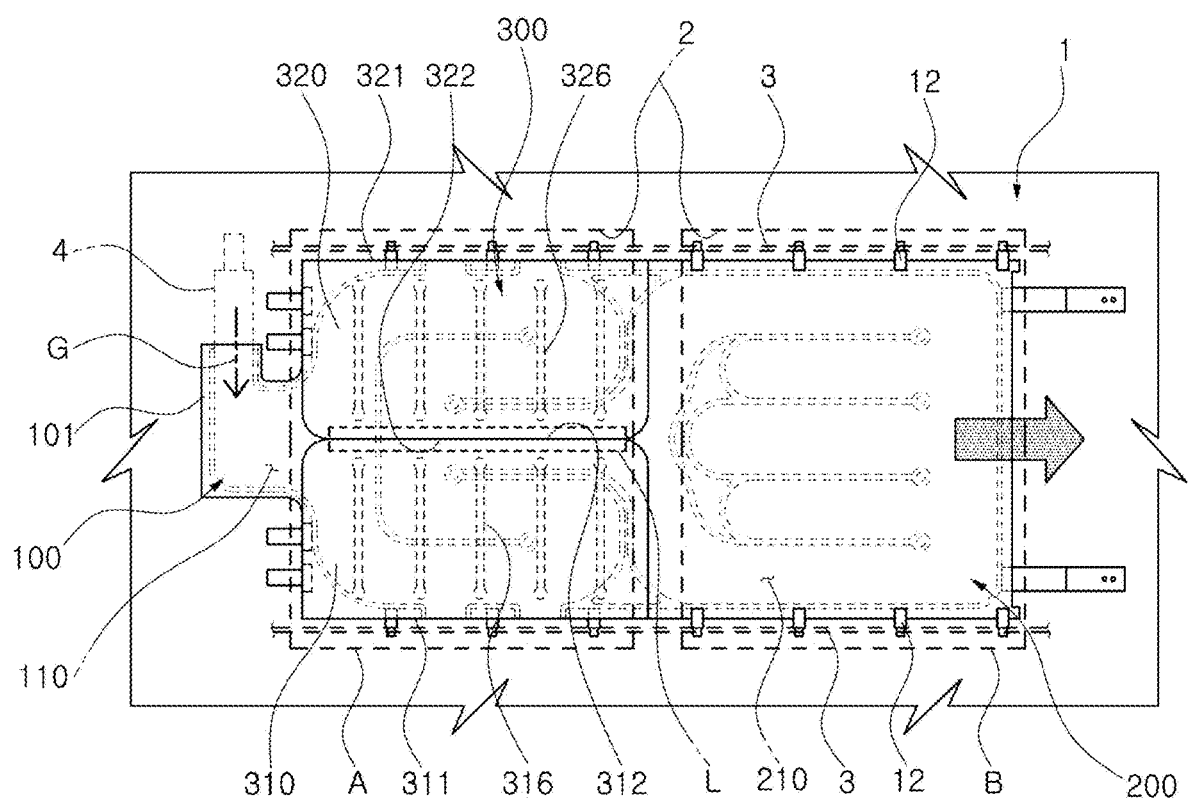
FIG. 5 is a front cross-sectional view illustrating that the auxiliary deployment part of the roof airbag apparatus in accordance with the embodiment of the present disclosure is sewed to the first-row deployment part.
Figure 6:
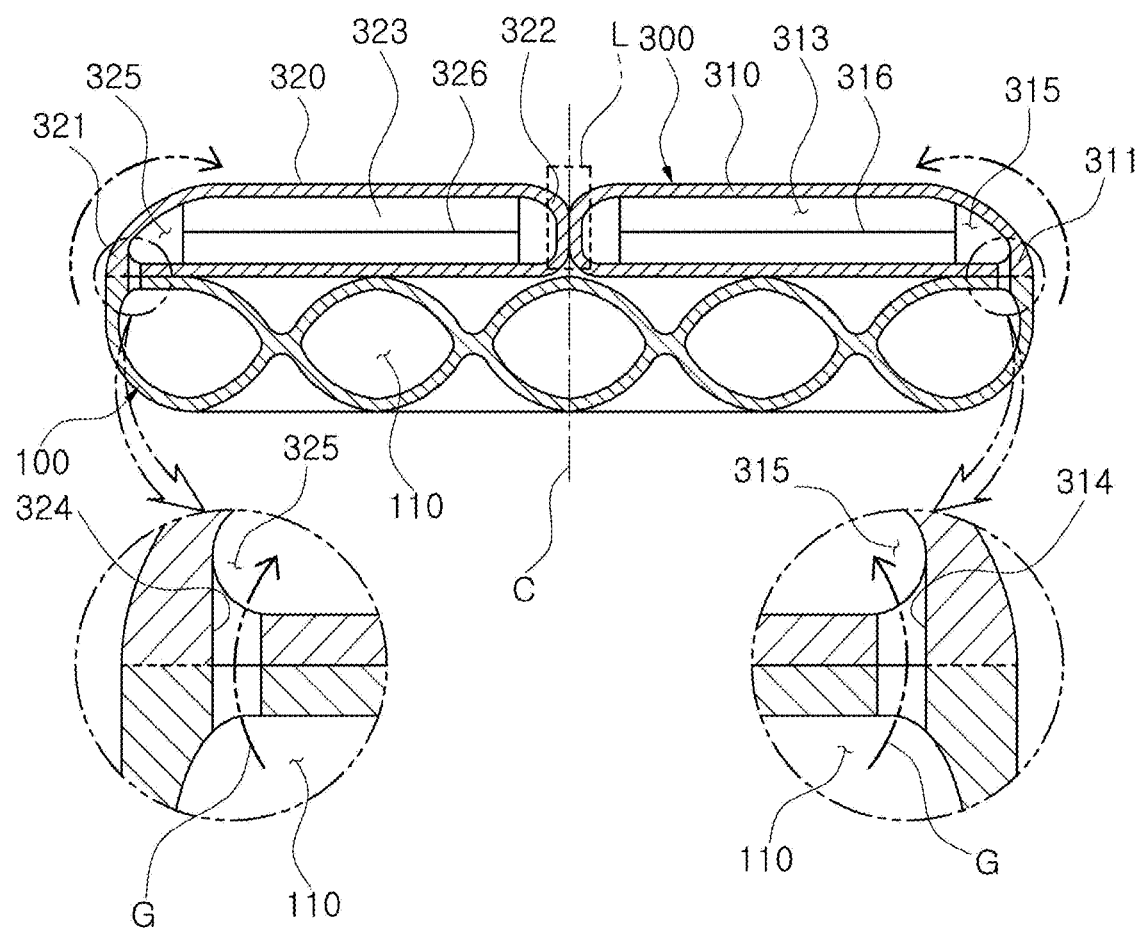
FIG. 6 is a side cross-sectional view illustrating the auxiliary deployment part of the roof airbag apparatus in accordance with the embodiment of the present disclosure.

FIG. 4 is a diagram illustrating that the auxiliary deployment part of the roof airbag apparatus in accordance with the embodiment of the present disclosure is sewed to the first-row deployment part, FIG. 5 is a front cross-sectional view illustrating that the auxiliary deployment part of the roof airbag apparatus in accordance with the embodiment of the present disclosure is sewed to the first-row deployment part, and FIG. 6 is a side cross-sectional view illustrating the auxiliary deployment part of the roof airbag apparatus in accordance with the embodiment of the present disclosure.

The roof airbag apparatus in accordance with the embodiment of the present disclosure is deployed when a vehicle rolls over, and blocks an open space of a roof 2, such that a passenger is not thrown out of the vehicle through the roof 2.

As illustrated in FIGS. 1 to 6, the roof airbag apparatus in accordance with the embodiment of the present disclosure includes a first-row deployment part 100, a second-row deployment part 200 and an auxiliary deployment part 300.

First, a discharge part of a gas supply part 4 for supplying inflation gas G is coupled to the rear of the first-row deployment part 100. When gas is supplied into the first-row deployment part 100, the first-row deployment part 100 is deployed from the front to the rear of the roof 20, and covers a front area A of the roof 2.

The first-row deployment part 100 has a first filling space 110 formed therein, such that the first filling space 110 is filled with the gas G supplied from the gas supply part 4.

The gas supply part 4 may be ignited through a method in which an ignition system ignites gunpowder according to a sensing signal of a collision sensor (not illustrated), and then generate gas.

The first filling space 110 may be divided into a plurality of spaces as illustrated in FIGS. 3 to 5, and form a moving path of the gas G injected from an inlet 101.

Furthermore, the inlet 101 for connecting the discharge part of the gas supply part 4 is formed at the rear of the first-row deployment part 100 so as to communicate with the first filling space 110.

The second-row deployment part 200 is coupled to a front end of the first-row deployment part 100 so as to communicate with the first-row deployment part 100. When the first-row deployment part 100 is deployed, the second-row deployment part 200 is deployed rearward to cover a rear area B of the roof 2.

The second-row deployment part has a second filling space 210 formed therein, the second filling space communicating with the first filling space 110 of the first-row deployment part 100 in a front-to-rear direction.

The second filling space 210 may be divided into a plurality of spaces as illustrated in FIGS. 3 to 5, and form a moving path of the gas G injected from the first filling space 110.

Furthermore, as illustrated in FIG. 1, a pair of tether guides 3 having a length in the front-to-rear direction may be provided in a side-to-side direction of the roof 2, and installed to correspond to the side-to-side direction of the roof 2.

At this time, both ends of the first-row deployment part 100 and both ends of the second-row deployment part 200 in the side-to-side direction may be coupled to the tether guides 3, respectively, so as to slide in the front-to-rear direction along the tether guides 3.

For this structure, each of the first-row and second-row deployment parts 100 and 200 may have a plurality of connection parts 12 provided at both ends thereof in the side-to-side direction, such that the connection parts 12 can be slid along the tether guides 3.

Furthermore, as illustrated in FIGS. 1 and 2, a housing 11 for housing the first-row and second-row deployment parts 100 and 200 may be installed at the front of the roof 2.

That is, the first-row and second-row deployment parts 100 and 200 may be reduced in volume so as to be housed in the housing 11. When the airbag apparatus is deployed, the first-row and second-row deployment parts 100 and 200 may be deployed through one side of the housing 11.

The auxiliary deployment part 300 may serve to reinforce strength by increasing the thickness of the first-row deployment part 100. When a passenger seated in a first row of the vehicle collides with the first-row deployment part 100, the auxiliary deployment part 300 may reduce the deformation in the first-row deployment part 100.

For this structure, the auxiliary deployment part 300 is coupled to a bottom surface of the first-row deployment part 100 so as to communicate with the first-row deployment part 100, and deployed to increase/decrease the top-to-bottom thickness of the first-row deployment part 100.

Alternatively, the auxiliary deployment part 300 may be coupled to the top surface of the first-row deployment part 100 so as to communicate with the first-row deployment part 100, and deployed to increase/decrease the top-to-bottom thickness of the first-row deployment part 100.

The auxiliary deployment part 300 may be folded to communicate with a left or right end of the first-row deployment part 100, and coupled to the top or bottom surface of the first-row deployment part 100.

More specifically, the auxiliary deployment part 300 may include a first chamber 310 and a second chamber 320 corresponding to the first chamber 310.

The first chamber 310 has a first connection end 311 formed on one side thereof and a first sewed end 312 formed on the opposite side of the one side. The first connection end 311 is coupled to communicate with the left end of the first-row deployment part 100, and the first sewed end 312 is coupled to the top or bottom of the first-row deployment part 100.

The first chamber 310 may be folded toward the bottom surface of the first-row deployment part 100 based on the first connection end 311, and horizontally positioned.

As illustrated in FIGS. 3 to 6, the first chamber 310 has an auxiliary filling space 313 formed therein so as to communicate with the first filling space 110 in a lateral direction.

The auxiliary filling space 313 of the first chamber 310 communicates with the first filling space 110 through one or more first paths 314 in the lateral direction.

The plurality of first paths 314 may be formed so as to be spaced apart from each other in the front-to-rear direction of the first-row deployment part 100 and the auxiliary deployment part 300.

That is, the gas G introduced into the first filling space 110 of the first-row deployment part 100 is introduced into the auxiliary filling space 313 of the first chamber 310 through the first path 314.

Furthermore, the auxiliary filling space 313 of the first chamber 310 may be horizontally divided into a plurality of spaces by one or more seam parts 316, such that the plurality of spaces communicate with one another.

The seam part 316 may serve to connect upper and lower ends of the auxiliary filling space 313, and the portion where the seam part 316 is positioned may have a shape in which the thickness thereof is reduced in the top-to-bottom direction.

The seam part 316 may have a length in the side-to-side direction. The one or more seam parts 316 may be disposed in the front-to-rear direction of the auxiliary filling space 313 so as to be spaced apart from each other, and divide the auxiliary filling space 313 in the front-to-rear direction.

Furthermore, the seam part 316 may have a connection flow path 315 formed on the left and right sides thereof, the connection flow path 315 being extended in the front-to-rear direction. The connection flow path 315 may connect the auxiliary filling spaces 313 divided by the seam parts 316.

The connection flow path 315 may be connected to the first filling space 110 through the above-described first path 314, and the auxiliary deployment part 300 may be deployed when gas is introduced into the connection flow path 315.

The second chamber 320 has a second connection end 321 formed on one side thereof and a second sewed end 322 formed on the opposite side to the one side. The second connection end 321 is coupled to communicate with the left end of the first-row deployment part 100, and the second sewed end 322 is coupled to the top or bottom of the first-row deployment part 100.

The second chamber 320 may be folded toward the bottom surface of the first-row deployment part 100 based on the second connection end 321, and horizontally positioned.

As illustrated in FIGS. 3 to 6, the second chamber 320 has an auxiliary filling space 323 formed therein so as to communicate with the first filling space 110 in the lateral direction.

The auxiliary filling space 323 of the second chamber 320 communicates with the first filling space 110 through one or more second paths 324 in the lateral direction.

The plurality of second paths 324 may be formed so as to be spaced apart from each other in the front-to-rear direction of the first-row deployment part 100 and the auxiliary deployment part 300.

That is, the gas G introduced into the first filling space 110 of the first-row deployment part 100 is introduced into the auxiliary filling space 323 of the second chamber 320 through the second path 324.

As illustrated in FIG. 4, the first and second sewed ends 312 and 322 are sewed to abut on each other at the top or bottom of the first-row deployment part 100.

The first and second sewed ends 312 and 322 may be sewed to abut on each other at the center position C of the first-row deployment part 100 in the side-to-side direction, and have a predetermined length in the front-to-rear direction.

Furthermore, the auxiliary filling space 323 of the second chamber 320 may be horizontally divided into a plurality of spaces by one or more seam parts 326, such that the plurality of spaces communicate with one another.

The seam part 326 may serve to connect upper and lower ends of the auxiliary filling space 323, and the portion where the seam part 326 is positioned may have a shape in which the thickness thereof is reduced in the top-to-bottom direction.

The seam part 326 may have a length in the side-to-side direction. The one or more seam parts 326 may be disposed in the front-to-rear direction of the auxiliary filling space 323 so as to be spaced apart from each other, and divide the auxiliary filling space 323 in the front-to-rear direction.

Furthermore, the seam part 326 may have a connection flow path 325 formed on the left and right sides thereof, the connection flow path 325 being extended in the front-to-rear direction. The connection flow path 325 may connect the auxiliary filling spaces 313 divided by the seam parts 316.

The connection flow path 325 may be connected to the first filling space 110 through the above-described second path 324, and the auxiliary deployment part 300 may be deployed when gas is introduced into the connection flow path 325.

The second chamber 320 may have a shape corresponding to the first chamber 310, and have the same or similar width as or to the first-row deployment part 100 when the first and second chambers 310 and 320 are sewed to each other.

Hereafter, referring to FIGS. 1 to 5, a deployment process of the roof airbag apparatus in accordance with the embodiment of the present disclosure will be described as follows.

First, when the airbag apparatus is deployed, the front end of the first-row deployment part 100 is deployed toward the rear of the roof 2, and simultaneously, the second-row deployment part 200 is deployed toward the rear of the roof 2.

At this time, the first-row deployment part 100 is horizontally positioned while blocking the front area A of the roof 2, and the second-row deployment part 200 is horizontally positioned while blocking the rear area B of the roof 2.

Simultaneously, the auxiliary deployment part 300 is deployed by the gas G transferred from the first-row deployment part 100, and reinforces the top-to-bottom thickness of the first-row deployment part 100.

In this state, the first-row deployment part 100 is positioned at the top of a front-row seat (not illustrated) of the vehicle, and the second-row deployment part 200 is positioned at the top of a rear-row seat (not illustrated) of the vehicle. Thus, a passenger is not thrown out of the vehicle through the roof 2, even though the vehicle rolls over.

Since the first-row deployment part 100 is deployed while the top-to-bottom thickness thereof is reinforced by the auxiliary deployment part 300, the deformation in the first-row deployment part 100 may be reduced. Furthermore, since a passenger is not thrown toward a moving glass (not illustrated) of the roof 2 even though the vehicle rolls over, it is possible to further improve the protection performance for the front area A of the roof 2.

As a result, when a vehicle accident occurs, the auxiliary deployment part 300 may be deployed together to reinforce the thickness of the first-row deployment part 100, thereby increasing flexural and torsional stiffness. Thus, deformation by an external force can be reduced, and the shock absorption performance can be improved, which makes it possible to stably protect a passenger.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A roof airbag apparatus comprising:
    a first-row deployment part configured to deploy from a front to a rear of a roof and cover a front area of the roof when gas is supplied from a gas supply part;
    a second-row deployment part coupled to the first-row deployment part and configured to deploy toward the rear of the roof and cover a rear area of the roof when the first-row deployment part is deployed; and
    an auxiliary deployment part coupled to a top or bottom surface of the first-row deployment part so as to communicate with the first-row deployment part, and configured to increase a top-to-bottom thickness of a portion of the roof airbag covering the front area of the roof when deployed.

2. The roof airbag apparatus of claim 1, wherein the auxiliary deployment part is folded to communicate with a left or right end of the first-row deployment part, and coupled to the top or bottom surface of the first-row deployment part.

3. The roof airbag apparatus of claim 1, wherein the auxiliary deployment part comprises:
    a first chamber having a first connection end formed on one side thereof and a first sewed end formed on the opposite side of the one side, wherein the first connection end is coupled to the left end of the first-row deployment part so as to communicate with the first-row deployment part, and the first sewed end is coupled to the top or bottom of the first-row deployment part; and
    a second chamber having a second connection end formed on one side thereof and a second sewed end formed on the opposite side of the one side, wherein the second connection end is coupled to the right end of the first-row deployment part so as to communicate with the first-row deployment part, and the second sewed end is coupled to the top or bottom of the first-row deployment part.

4. The roof airbag apparatus of claim 3, wherein the first and second sewed ends are sewed to abut on each other at the top or bottom of the first-row deployment part.

5. The roof airbag apparatus of claim 4, wherein the first and second sewed ends are sewed to abut on each other at the center position of the first-row deployment part in a side-to-side direction, while having a length in a front-to-rear direction.

6. The roof airbag apparatus of claim 3, wherein the first-row deployment part has a first filling space formed therein, the first filling space being filled with gas supplied from the gas supply part,
    the second-row deployment part has a second filling space formed therein, the second filling space communicating with the first filling space in a front-to-rear direction, and
    each of the first and second chambers has an auxiliary filling space formed therein, the auxiliary filling space communicating with the first filling space in a lateral direction.

7. The roof airbag apparatus of claim 6, wherein the auxiliary filling space of the first chamber communicates with the first filling space through one or more first paths in the lateral direction, and
    the auxiliary filling space of the second chamber communicates with the first filling space through one or more second paths in the lateral direction.

8. The roof airbag apparatus of claim 7, wherein the plurality of first paths are formed in the front-to-rear direction so as to be spaced apart from each other, and the plurality of second paths are formed in the front-to-rear direction so as to be spaced apart from each other.

9. The roof airbag apparatus of claim 6, wherein the auxiliary filling space is horizontally divided into a plurality of spaces by one or more seam parts, such that the plurality of spaces communicate with one another.

10. The roof airbag apparatus of claim 9, wherein the seam parts have a length in a side-to-side direction, are disposed in the front-to-rear direction of the auxiliary space so as to be spaced apart from each other, and divide the auxiliary filling space in the front-to-rear direction.

11. The roof airbag apparatus of claim 10, wherein a connection flow path is formed on a left and right of the seam part so as to extend in the front-to-rear direction, and
    the connection flow path connects the auxiliary filling spaces, divided by the seam parts, to each other.

12. The roof airbag apparatus of claim 1, wherein the roof has a pair of tether guides formed on a left and right sides thereof, and having a length in the front-to-rear direction, and
    both ends of the first-row deployment part and both ends of the second-row deployment part in the side-to-side direction are coupled to the respective tether guides so as to slide in the front-to-rear direction along the tether guides.

* * * * *